Nov. 27, 1956

G. M. DAVEY 2,771,966

AXIAL DISC BRAKE

Filed April 5, 1954

INVENTOR.
GEORGE M. DAVEY
BY C. G. Stratton
ATTORNEY

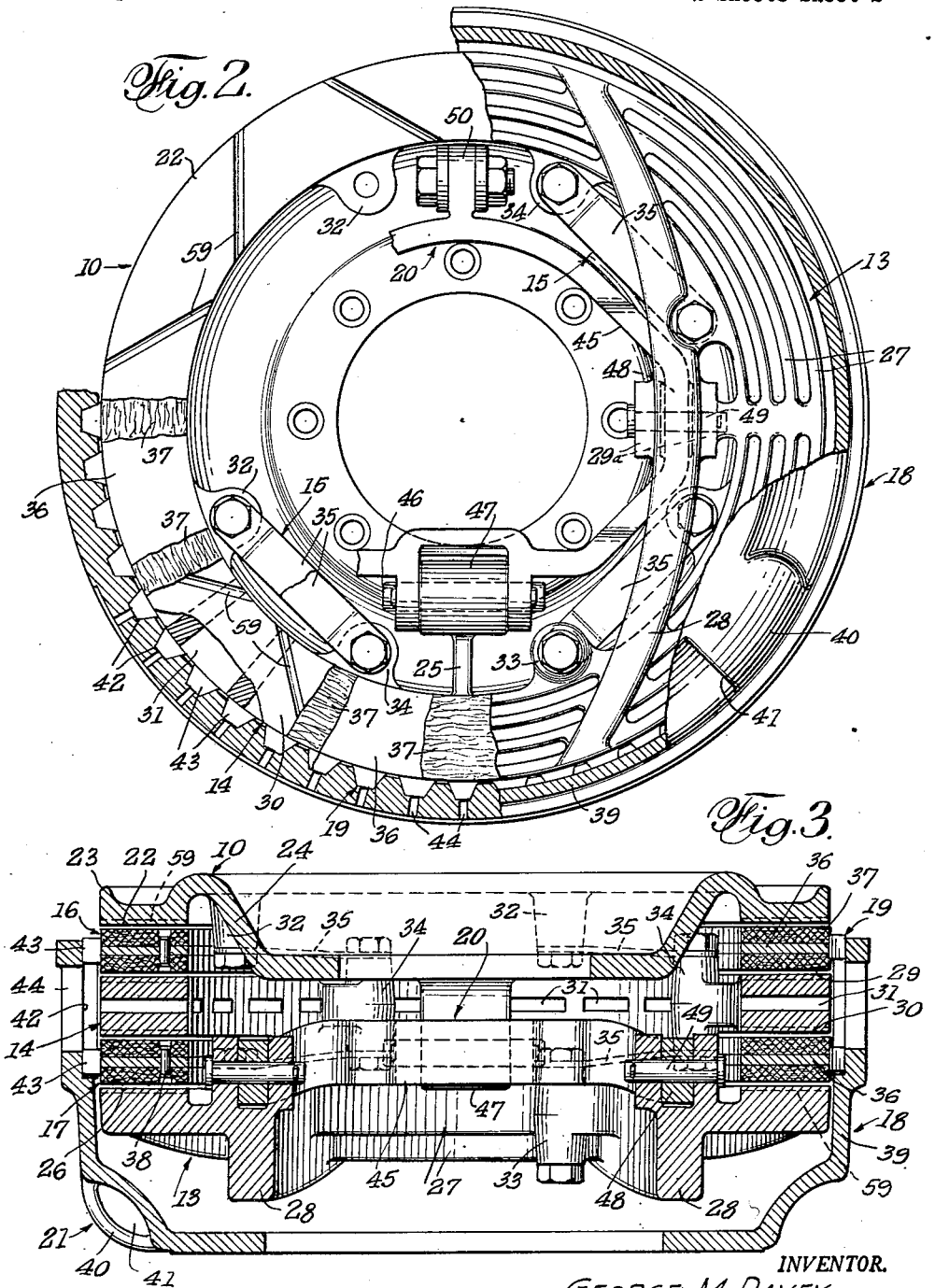

United States Patent Office 2,771,966
Patented Nov. 27, 1956

2,771,966

AXIAL DISC BRAKE

George M. Davey, Downey, Calif., assignor to Hadco Engineering Co., Inc., Huntington Park, Calif., a corporation of California Application April 5, 1954, Serial No. 420,810

10 Claims. (Cl. 188—72)

This invention relates to a brake construction more particularly adapted for heavy duty installations as on truck wheels, although the same may be adapted for general use on vehicle wheels. More specifically, the invention deals with a power-operated brake construction of the disc type.

One of the primary factors in any brake construction is the braking area, i. e., the amount of brake lining surface that is applied to the brake drum. All else being equal, the larger such area, the more powerful are the brakes. However, particularly in brakes that apply the lined brake shoes to the inner cylindrical wall of the brake drum, there are practical limits to the drum diameter and the width of the brake shoes, these limits being controlled by wheel sizes and tire tread widths.

The braking area can be materially increased and yet keep the diametral and width dimensions of the brake within proper limits, by a twin disc construction, and it is an object of the present invention to provide a twin disc brake of novel and improved form.

Another factor in brake efficiency is temperature generation during braking. Another object of this invention is to provide a novel brake structure that is self air cooled to improve braking power and reduce the wear on the brake lining.

A further object of the invention is to provide a twin disc brake that embodies a novel interconnecting arrangement of members which engage the brake shoes to provide a powerful, yet somewhat elastic, braking operation that results in rapid yet smooth vehicular stops.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes, one embodiment of the present invention, which is given by way of illustration or example only.

In the drawings, like reference characters designate similar parts in the several views.

Fig. 2 is a face view of the brake with parts broken away in successive stages.

Fig. 3 is a cross-sectional view of the brake taken at right angles to the line of section of Fig. 1.

Figure 1:
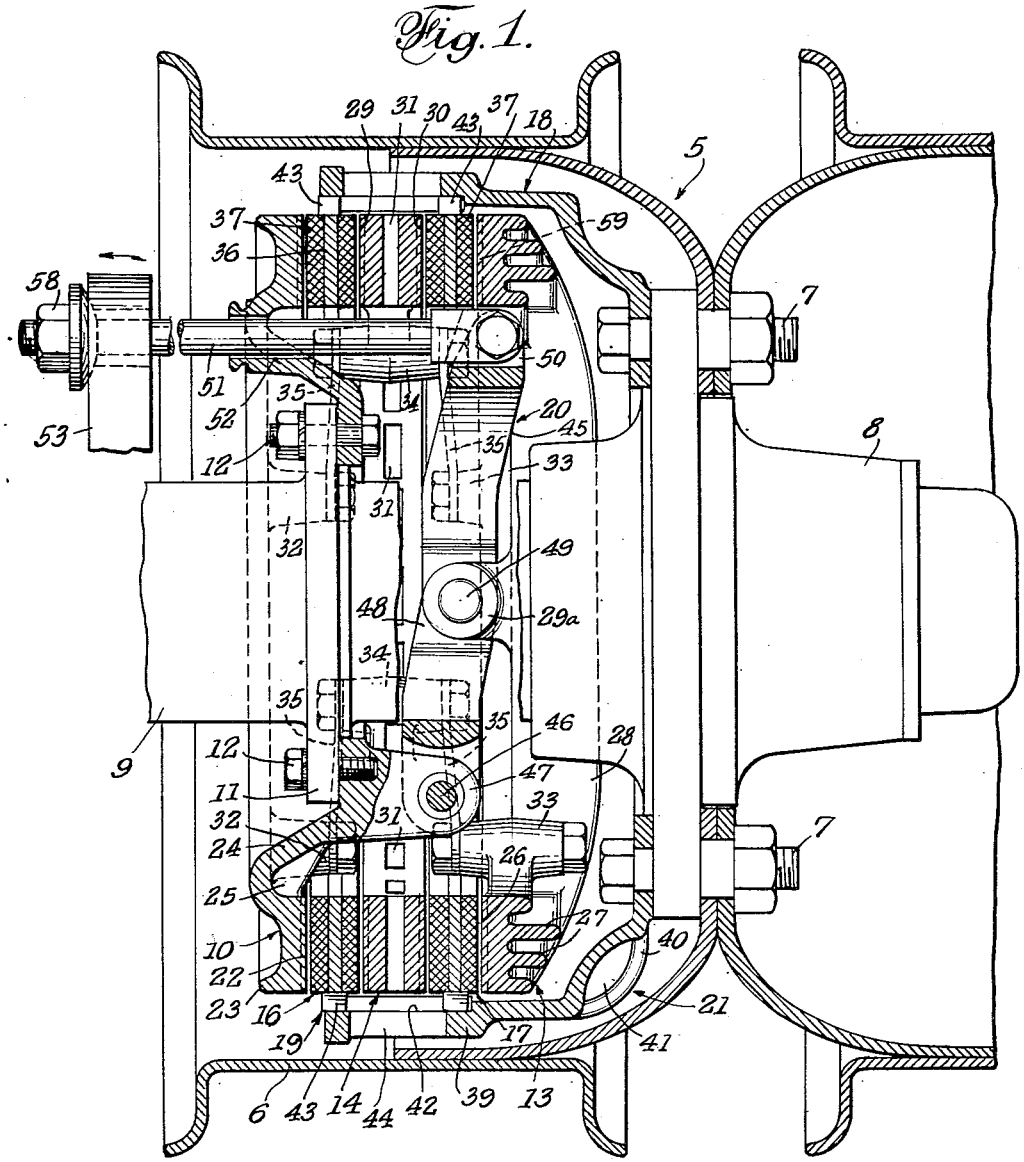
Fig. 1 is a cross-sectional view of a brake according to the present invention and shown in operative position mounted within a wheel felly.

The power brake that is illustrated is shown in its normal position of installation in a wheel 5 which, in this instance, is shown as a dual wheel. The brake is shown housed within the hollow of the inner wheel 6 which, in the usual manner is removably attached, as by bolts 7, to the rotating hub 8 on the spindle that protrudes from the conventional fixed axle 9.

The brake that is illustrated comprises, generally, a backing plate 10 fixedly secured to a flange 11 on axle 9 as by bolts 12, a front pressure plate 13 outwardly spaced from backing plate 10, a center ring 14 between said plates 10 and 13, link means 15 interconnecting said plates and ring, similar braking discs 16 and 17 disposed respectively between plate 10 and ring 14, and plate 13 and ring 14, a housing drum 18 fastened to spindle 8 by the mentioned bolts 7, sliding key connection means 19 non-rotationally interconnecting the braking discs 16 and 17 and drum 18, pressure means 20 operable to move the front plate 13 toward backing plate 10 and, thereby, apply braking force to the brake, and cooling means 21 embodied in the drum 18, the outer plate 13 and the center ring 14 to establish a circulation of cooling air among the several brake elements during application of the brake to cool the brake assembly.

The backing plate 10 preferably comprises a metal casting that is provided with an outwardly directed annular face 22. In order that said plate be substantially rigid, so as not to flex under pressure applied to said face, the same is formed to have an annular rearward stiffening flange 23 and a dished annular portion 24 inwardly of face 22 and suitable ribs 25 radially across said dished portion. In this or in a comparable manner, said plate 10 is made to strongly resist deflection under braking force.

The front pressure plate 13 also preferably comprises a metal casting and is of the same diametral size as plate 10. Plate 13 is formed as a ring having an inwardly directed annular face 26 and is provided with outwardly directed annular ribs or fins 27 which not only render said plate substantially inflexible but serve also as cooling fins and, therefore, are part of the cooling means 21. On each side, said plate 13 is preferably integrally provided with a rigidifying brace 28 that also has the purpose of providing pivot bearings 29a for the pressure means 20. The bearings are aligned on a diametral line of said plate.

As shown, plates 10 and 13 are concentrically arranged on the axis of axle 9 and with their respective faces 22 and 26 in opposed relation.

The center ring 14 is provided with opposed side faces 29 and 30 and is of the same diametral size as plates 10 and 13, the face 29 being in opposition to face 22 and the face 30 in opposition to face 26. Said ring is provided with a plurality of radial air passages 31 that are also part of the cooling means 21.

The link means 15 interconnecting plates 10 and 13 and ring 14 comprises a set of equally spaced bearing bosses 32 formed integrally on backing plate 10, a second set of similarly spaced bearing bosses 33 formed integrally on front pressure plate 13, a third set of similarly spaced bearing bosses 34 formed integrally on the center ring 14 and extending outwardly from the ring on each side thereof, and pairs of laterally flexible links 35 interconnecting the three sets of bosses.

In this instance, each set of bosses 32, 33 and 34 comprises four bosses and the bosses of set 32 are aligned with the bosses of set 33. The bosses of set 34 are preferably spaced 45° out of phase in relation to the bosses of sets 32 and 33. In this manner, said bosses are disposed in octagonal arrangement, as can be seen from Fig. 2. Also, there are four sets or pairs of links 35, each pair interconnecting each boss 34 with an adjacent boss 32 on the one side of ring 14 and with an adjacent boss 33 on the other side of said ring. Thus, the pressure plate 13 and center ring 14 are connected to fixed backing plate 10 by means of the links 35 and are held against rotation.

It will be noted that the links 35 are slightly bent so that the ends thereof are offset, as shown in Fig. 1. Thus, when a pair of links are secured to bosses 34, the ends thereof secured to said bosses are spaced closer together than the ends secured to bosses 32 and 33. In this manner the links space the braking elements so that the respective pairs of faces 22 and 29, and 26 and 30 respectively accommodate braking discs 16 and 17 therebetween without frictional engagement with said discs.

Each braking disc 16 and 17 comprises a metal ring 36 and a brake lining or facing 37 on each side of said ring, said lining being secured in place as by rivets 38.

The housing drum 18 is rotational with spindle housing 8 and, therefore, with wheel 5. Said drum preferably comprises a metal casting having a cylindrical flange 39 within which the plate 13, ring 14 and braking discs 16 and 17 are housed. In any suitable portion of its periphery, as at the outer portions thereof, said drum is formed with a suitable number of air scoops 40 that are formed as louvres which collect air during rotation of the wheel and direct the same into the interior of the drum through openings 41 immediately adjacent said scoops. All of the scoops may be in the same direction, that of normal forward rotation of the wheel, or some may be in one direction and some in the other so that air is drawn into the housing drum regardless of the direction of rotation of the wheel. Said scoops 40 and openings 41 also form part of the cooling means 21.

The connection means 19 comprises a series of preferably uniformly spaced spline seats 42 in the inner face of drum flange 39, the same extending outwardly from the inwardly directed edge of said flange, and a set of splines 43 on the outer peripheral edge of plate 36 of each braking disc 16 and 17. Said splines 43 slidingly fit the spline seats 42 so that discs 16 and 17 are rotationally keyed to drum flange 39 and yet are adapted to slide laterally as will later be seen.

Air outlet passages 44, also part of the cooling means 21, are formed in drum flange 39 and extend from spline seats 42 to the outer periphery of said flange.

The pressure means 20 is shown as an arm 45 mounted on a pivot 46 in a boss 47 integrally formed on backing plate 10 and inwardly of the housing drum 18 through the ring 14. In order to clear axle 9, said arm is formed as a frame-like member surrounding said axle, and the sides 48 of said arm are pivotally connected by pins 49 to front pressure plate 13, said pins passing through the mentioned pivot bearings 29a in the brace 28.

Said boss 47 is provided on one side of axle 9 and on the opposite side, said arm 45 is provided with an ear or lug 50.

Either compressed air or suction may be used to move arm 45 on its pivot 46 and the same may be applied to a rod 51 connected to the arm 45 by the ear 50 and extending through a clearance hole 52 in backing plate 10. As shown, the air or suction power is applied to rod 51 by an arm 53, the direction of the force being toward the left as in Fig. 1, as indicated by the arrow.

Since links 35 normally space the five concentric elements of the brake, consisting of the plates 10 and 13, the discs 16 and 17, and the ring 14 in the manner shown, that is, in a non-engaging relation, it will be clear that a pull on rod 51 toward the left will rock arm 45 on its pivot in the same direction. By means of the connection 49 with the front plate, said arm draws said plate toward the left to produce frictional engagement among the brake elements. It will be noted that when the braking power is applied, the full length of arm 45 is used, and that this force is increased by the shorter lever between pivots 46 and 49.

A nut 58 provides a single element for adjusting the initial clearance among the brake elements. Shortening the effective length of rod 51 reduces brake clearance and lengthening said rod increases such clearance.

The surfaces 22, 26, 29 and 30 are preferably provided with angularly disposed grooves 59 that render said surfaces self-cleaning of road dust, particles of brake lining, etc. that may tend to accumulate thereon. Said groove comprises part of the air cooling means 21 but serves as exit passages for extraneous particles.

While the foregoing illustrates and describes what is now contemplated to be the best mode of carrying out the invention, the construction is, of course, subject to modification without departing from the spirit and scope of the invention. It is, therefore, not desired to restrict the invention to the particular form of construction illustrated and described, but to cover all modifications that may fall within the scope of the appended claims.

Having thus described the invention, what is claimed and desired to be secured by Letters Patent is:

1. A brake comprising a rotationally mounted housing drum, two spaced brake discs rotationally carried by the drum, means connecting said discs and said drum and slidingly engaged with the inner face of said drum, a non-rotational backing plate on one side of one of said brake discs, a pressure plate on the opposite side of the other brake disc, a center ring between the discs, link means non-rotationally connecting said center ring and the backing plate and the center ring and the pressure plate, and means pivotally mounted on the backing plate and connected to the pressure plate to move and press the lateral faces of said plates, ring and discs together to arrest rotation of the housing drum.

2. A brake according to claim 1: the links being laterally resilient and normally spacing the center ring from the backing plate and the pressure plate to freely accommodate the brake discs therebetween, and the mentioned movement of the pressure plate flexing the links laterally.

3. A brake according to claim 1: the housing drum being formed to have air-scooping means that draws air into said drum during rotation thereof, said air circulating between the faces of the two plates, the center ring and the brake discs, said ring being provided with air outlet passages, and said housing drum also being provided with air outlet passages aligned with said air outlets in the center ring.

4. A brake according to claim 1: said connecting means comprising splines provided on the outer peripheries of said discs, and said housing drum being provided with spline seats to slidingly receive said splines so that said discs rotate with the housing drum.

5. A brake according to claim 1: the housing drum being formed to have air-scooping means that draws air into said drum during rotation thereof, said air circulating among the faces of the two plates, the center ring and the brake discs, and air outlet passages in the center ring and in the housing drum portion aligned with said center ring; the two plates having substantially inflexible cross-sectional form; and the pressure plate having circular ribs which, in addition to stiffening said plate, effect a heat exchange with the air circulating in the housing drum.

6. A twin-disc brake comprising a drum having cylindrical flange, two brake discs mounted within said drum with the peripheries of said discs adjacent said flange, means connecting said drum and said discs, said means comprising splines located in between said flange and the peripheries of said discs, a fixed backing plate on one side of one brake disc, a pressure plate on the opposite side of the other brake disc, a center ring between the discs, an arm pivotally mounted on the backing plate and connected to the pressure plate to move the same toward the backing plate and, thereby, press said plates, discs and ring together, and link means interconnecting said plates and center ring to non-rotationally hold the pressure plate and center ring during lateral movement thereof by said arm.

7. A brake comprising a rotationally mounted housing drum, two spaced brake discs rotationally carried by said drum and provided on their outer peripheries with splines, said housing drum being provided with spline seats to slidingly receive said splines so that said discs rotate with said drum, a non-rotational backing plate on one side of one of said brake discs, a pressure plate on the opposite side of the other brake disc, a center ring between the discs, link means non-rotationally connecting said center ring and the backing plate and the center ring and the pressure plate, and means pivotally mounted on the backing plate and connected to the pressure plate to move and press the lateral faces of said plates, ring and discs together to arrest rotation of the housing drum.

8. In a twin-disc brake the combination comprising a backing plate adapted to be fixedly secured to an axle, a movable pressure plate spaced from said backing plate, an arm pivotally mounted on said backing plate and pivotally connected to said pressure plate, a pair of brake discs concentric with said plates and mounted therebetween, a center ring mounted between said pair of brake discs, means linking said center ring with said plates and holding said ring and said plates out of engagement with said brake discs, and means to pivot said arm to bring said ring and said plates into engagement with said discs.

9. In a twin-disc brake according to claim 8: said arm comprising a frame-like member surrounding said axle and pivotally connected to said backing plate on one side of said axle, a pair of pivot pins on two sides of said arm, said pins providing a connection for said pressure plate, and a lug on said arm on the other side of said axle from said connection to the backing plate, said arm pivoting means being pivotally connected to said arm by said lug.

10. In a twin-disc brake having a backing plate fixedly secured to an axle and a pressure plate pivotally connected to said backing plate, the combination comprising a pair of brake discs mounted concentric to said plates, a center ring mounted between said pair of discs, said ring having a plurality of bosses extending outwardly on each side thereof and each of said plates also having a plurality of bosses spaced out of phase in relation to the bosses on said ring, and a plurality of links connecting the bosses on one side of said ring with the bosses of the backing plate and connecting the bosses on the other side of said ring with the bosses of the pressure plate.

References Cited in the file of this patent

UNITED STATES PATENTS

| | | |
|---|---|---|
| 2,015,729 | Robbins | Oct. 1, 1935 |
| 2,266,059 | Milan | Dec. 16, 1941 |
| 2,304,368 | Milan | Dec. 8, 1942 |
| 2,466,990 | Johnson et al. | Apr. 12, 1949 |
| 2,655,227 | Eksergian | Oct. 13, 1953 |